(12) United States Patent
Gonzaga

(10) Patent No.: US 7,296,351 B2
(45) Date of Patent: Nov. 20, 2007

(54) METHOD FOR SERVICING A TIRED-WHEEL

(75) Inventor: Tullio Gonzaga, Correggio (IT)

(73) Assignee: Butler Engineering & Marketing SPA, Rio Saliceto (Reggio Emilia) (IT)

( * ) Notice: Subject to any disclaimer, the term of this patent is extended or adjusted under 35 U.S.C. 154(b) by 0 days.

(21) Appl. No.: 11/471,616

(22) Filed: Jun. 21, 2006

(65) Prior Publication Data

US 2007/0006976 A1 Jan. 11, 2007

Related U.S. Application Data

(62) Division of application No. 10/847,674, filed on May 18, 2004, now Pat. No. 7,089,987.

(30) Foreign Application Priority Data

May 19, 2003 (IT) .......................... VR2003A0062

(51) Int. Cl.
*B23P 11/00* (2006.01)
(52) U.S. Cl. .................. 29/894.31; 29/402.01; 29/407.01; 29/407.05; 29/407.09; 29/407.1; 29/426.1; 157/14; 157/1.17; 157/1.24
(58) Field of Classification Search ............ 29/894.31, 29/402.01, 402.03, 402.07, 407.01, 407.05, 29/407.09, 407.1, 426.1, 426.3, 426.5, 705; 157/14, 1.17, 1.24
See application file for complete search history.

(56) References Cited

U.S. PATENT DOCUMENTS

| 3,461,938 A | 8/1969 | Mueller |
| 3,545,463 A | 12/1970 | Mueller |
| 4,830,079 A | 5/1989 | Onuma |
| 5,035,274 A | 7/1991 | Kinnick et al. |
| 5,088,539 A | 2/1992 | Mannen et al. |
| 5,094,284 A | 3/1992 | Curcuri |
| 5,141,040 A | 8/1992 | Curcuri |
| 5,170,828 A | 12/1992 | Curcuri |
| 5,226,465 A | 7/1993 | Schön et al. |
| 5,385,045 A | 1/1995 | Mannen et al. |

(Continued)

FOREIGN PATENT DOCUMENTS

EP  1 207 061  5/2002

(Continued)

*Primary Examiner*—Jermie E. Cozart
(74) *Attorney, Agent, or Firm*—Nixon & Vanderhye P.C.

(57) ABSTRACT

A tired-wheel having a wheel-rim and a tire thereon is automatically serviced. The method includes loading the tired-wheel onto a motor-driven support mounted for rotation about an axis of rotation, centering the tired-wheel with respect to the axis of rotation, and holding it by use of the motor-driven rotatable support, urging the wheel-rim against the rotatable support by use of an urging device so as to make the tired-wheel rigid in rotation with the rotatable support, disassembling the tire from the wheel-rim by use of a pair of working arms, moving away the urging device and removing the disassembled tire, loading a new tire onto the wheel-rim, repositioning the urging device and urging the wheel-rim against the rotatable support, and mounting the new tire onto the wheel-rim by use of the pair of working arms.

12 Claims, 18 Drawing Sheets

| U.S. PATENT DOCUMENTS | | | | FOREIGN PATENT DOCUMENTS | | |
|---|---|---|---|---|---|---|
| 5,490,552 A | 2/1996 | Vignoli | | EP | 1 253 026 | 10/2002 |
| 5,876,501 A | 3/1999 | Doan | | GB | 2 104 460 | 3/1983 |
| 6,029,716 A | 2/2000 | Hawk | | JP | 56-071607 | 6/1981 |
| 6,076,586 A | 6/2000 | Hans | | JP | 62-088602 | 4/1987 |
| 6,408,921 B1 | 6/2002 | Bonacini | | JP | 4-085119 | 3/1992 |
| 6,557,610 B2 | 5/2003 | Koerner et al. | | JP | 10-217725 | 8/1998 |
| | | | | JP | 11-192823 | 7/1999 |

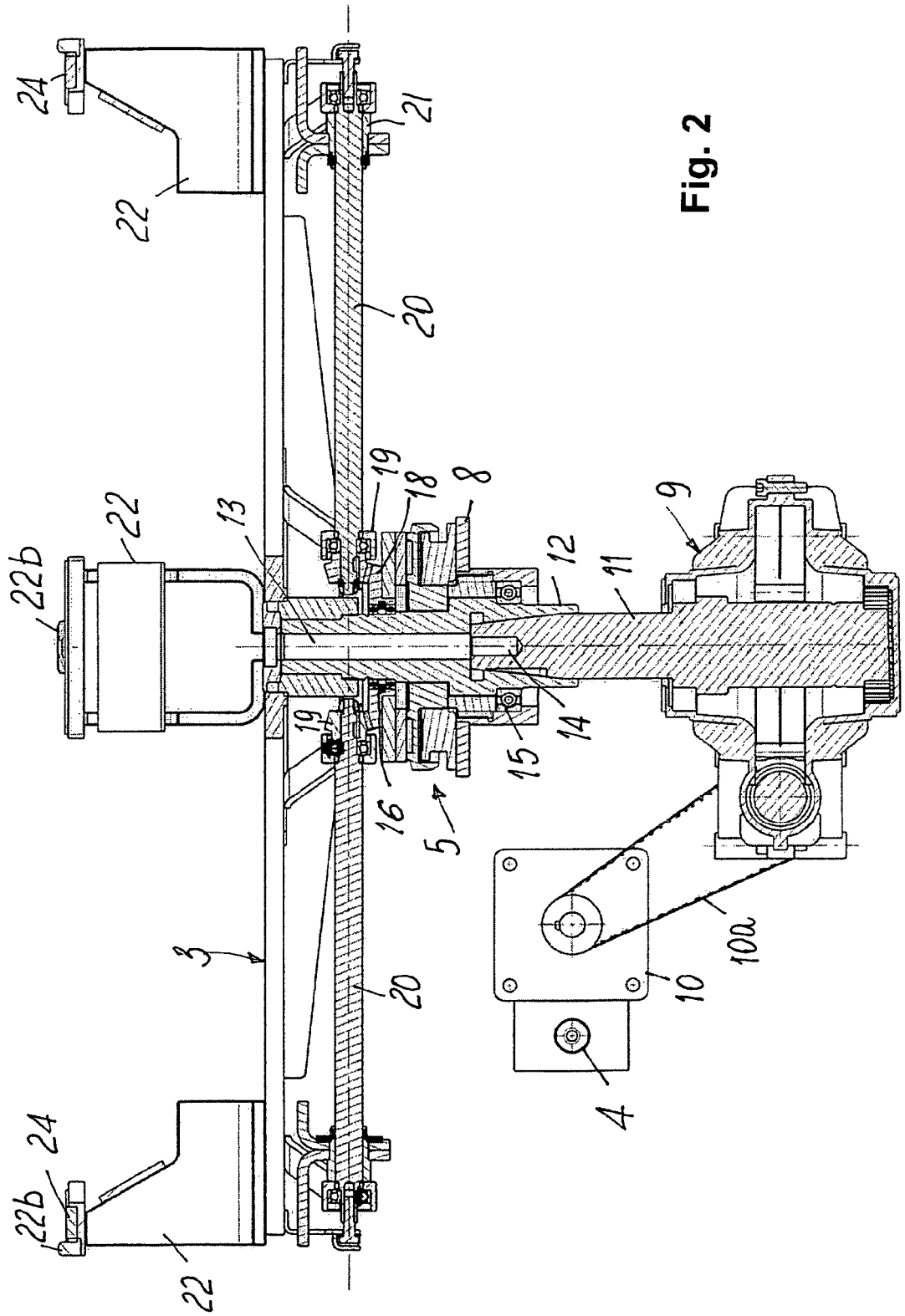

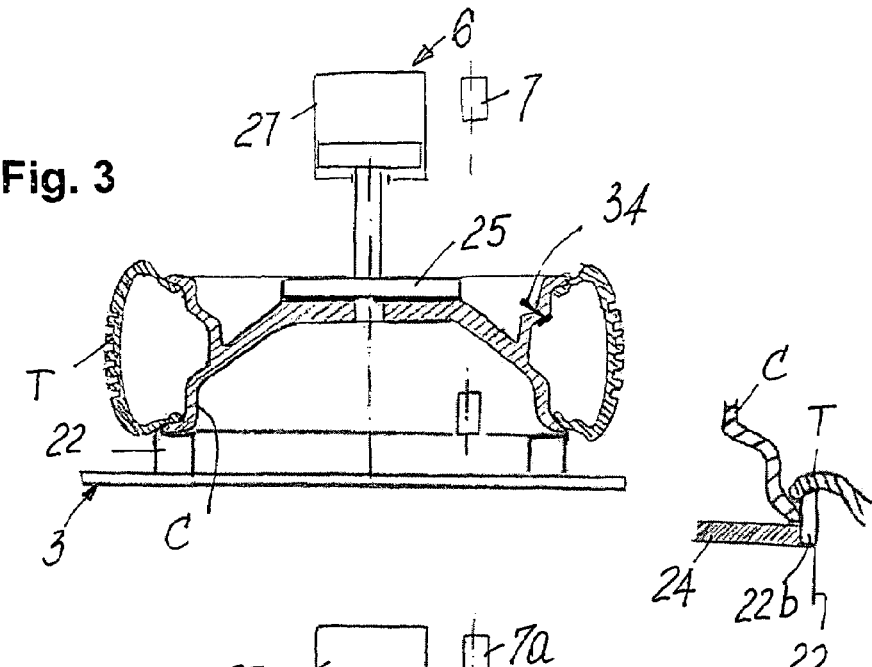
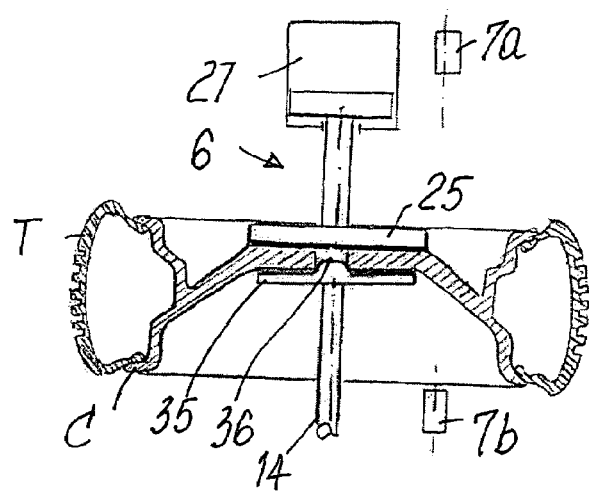
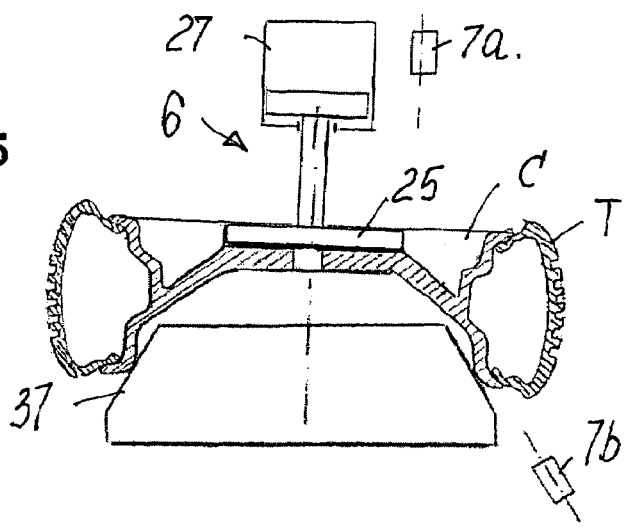

METHOD FOR SERVICING A TIRED-WHEEL

CROSS-REFERENCES TO RELATED APPLICATIONS

This application is a divisional of U.S. patent application Ser. No. 10/847,674, filed May 18, 2004, now U.S. Pat. No. 7,089,987 which claims priority of Italian Patent Application No. VR2003A000062, filed May 19, 2003. The entire contents of these applications are incorporated herein by reference.

FIELD OF THE INVENTION

The present invention relates to a method for automatically servicing a tired-wheel for motor-vehicles, i.e., for replacing the tire or the wheel-rim.

In the field of motor-vehicle tired-wheel maintenance or servicing, an operator (tire-dealer) equipped with a conventional tire assembling-disassembling, or tire assembling-disassembling machine, is required to assess by sight, or to measure the diameter and/or thickness of a wheel-rim, to select a suitable type of tire for a given wheel-rim or, conversely, a suitable wheel-rim for a given tire, to locate the position of the inflation valve and to carry out several other tasks. Moreover, the operator must manually carry out a number of operations, some of which are hard and for which care must be taken to adopt a whole series of measures geared at preventing the tire or the wheel-rim, particularly if made of a light alloy, from being damaged.

Inevitably, owing to the complexity of the operations to be carried out, and of the wealth of knowledge to exploit, at times mistakes are made that cause damage to tires and additional costs to be sustained.

In order to make the task of the tire-dealer easier, some solutions, albeit unsatisfactory, have already been suggested which are aimed at expediting single operations, such as providing an automatic tired-wheel loading device on the rotatable plate, or table or, anyway, on the self-centering unit of a tire assembling-disassembling machine, or else ejection-proof systems to prevent accidents caused by a tire being burst from occurring as a tire is inflated once it has just been replaced, or else a chip built-into the tire for displaying the peculiar features of a tire on a suitable displaying device embedded in the tire in order to provide the tire-dealer with reliable information.

Moreover, these are isolated solutions that minimally, if not in some instances negligibly, obviate the difficulties faced with by a tire-dealer in his daily job.

SUMMARY OF THE INVENTION

A main object of the present invention is to provide a method or servicing a tired-wheel for motor-vehicles which makes it possible to automatically carry out a whole series of measurement and control operations, besides assembling-disassembling a tired-wheel, that would be time-consuming if they were attended to by the tire-dealer with the necessary accuracy.

Another object of the present invention is to provide a very effective servicing method that can be carried out in a very simple way.

Another object of the present invention is to provide a method for servicing a tired-wheel for motor-vehicles allowing a number of tiring operations to be carried out, such as loading a wheel to be checked and maintained on a tire assembling-disassembling machine, and unloading it therefrom after servicing has been completed.

Another important object of the present invention is to provide a method for servicing motor-vehicle wheels that is suitable for self-teaching and updating the information relating to a wheel being serviced for subsequently recognizing it in connection with a network some time later on.

These and still other objects, that will be better apparent below, are accomplished by a method for automatically servicing a tired-wheel having a wheel-rim and a tire thereon, comprising:

loading the tired-wheel onto a motor-driven support mounted for rotation about an axis of rotation, centering the tired-wheel with respect to the axis of rotation, and holding it by means of the motor-driven rotatable support, urging the wheel-rim against the rotatable support by means of an urging device so as to make the tired-wheel rigid in rotation with the rotatable support, disassembling the tire from the wheel-rim by means of a pair of working arms, moving away the urging device and removing the disassembled tire, loading a new tire onto the wheel-rim, repositioning the urging device and urging the wheel-rim against the rotatable support, and mounting the new tire onto the wheel-rim by means of the pair of working arms.

BRIEF DESCRIPTION OF THE DRAWINGS

Further aspects and advantages of the method according to the present invention will be better apparent from the following detailed description of a number of currently preferred embodiments of an apparatus for servicing a tired wheel, illustrated by way of indicative not limiting examples in the accompanying drawings, in which:

FIG. 2 is an axial vertical section view on an enlarged scale of the motor-driven rotatable-plate or support unit of FIG. 1;

FIG. 3 shows a diagrammatic diametral section front elevation view of a first embodiment of a means for locking a wheel-rim to the rotatable plate of the tire assembling-disassembling machine included in the servicing apparatus shown in FIG. 1;

FIG. 3A shows a cross-section view of a detail of FIG. 3;

FIG. 4 is a diagrammatic diametral section front elevation view of a second embodiment of a means for locking a wheel to the rotatable plate of the tire assembling-disassembling machine included in the servicing apparatus of FIG. 1;

FIG. 5 shows a diagrammatic and diametral section front elevation view of a third embodiment of a means for locking a wheel-rim to the rotatable plate of the tire assembling-disassembling machine included in the servicing apparatus of FIG. 1;

The same or similar components and/or parts in the accompanying drawings were designated by the same reference numerals.

DESCRIPTION OF THE PREFERRED EMBODIMENTS

Figure 1:
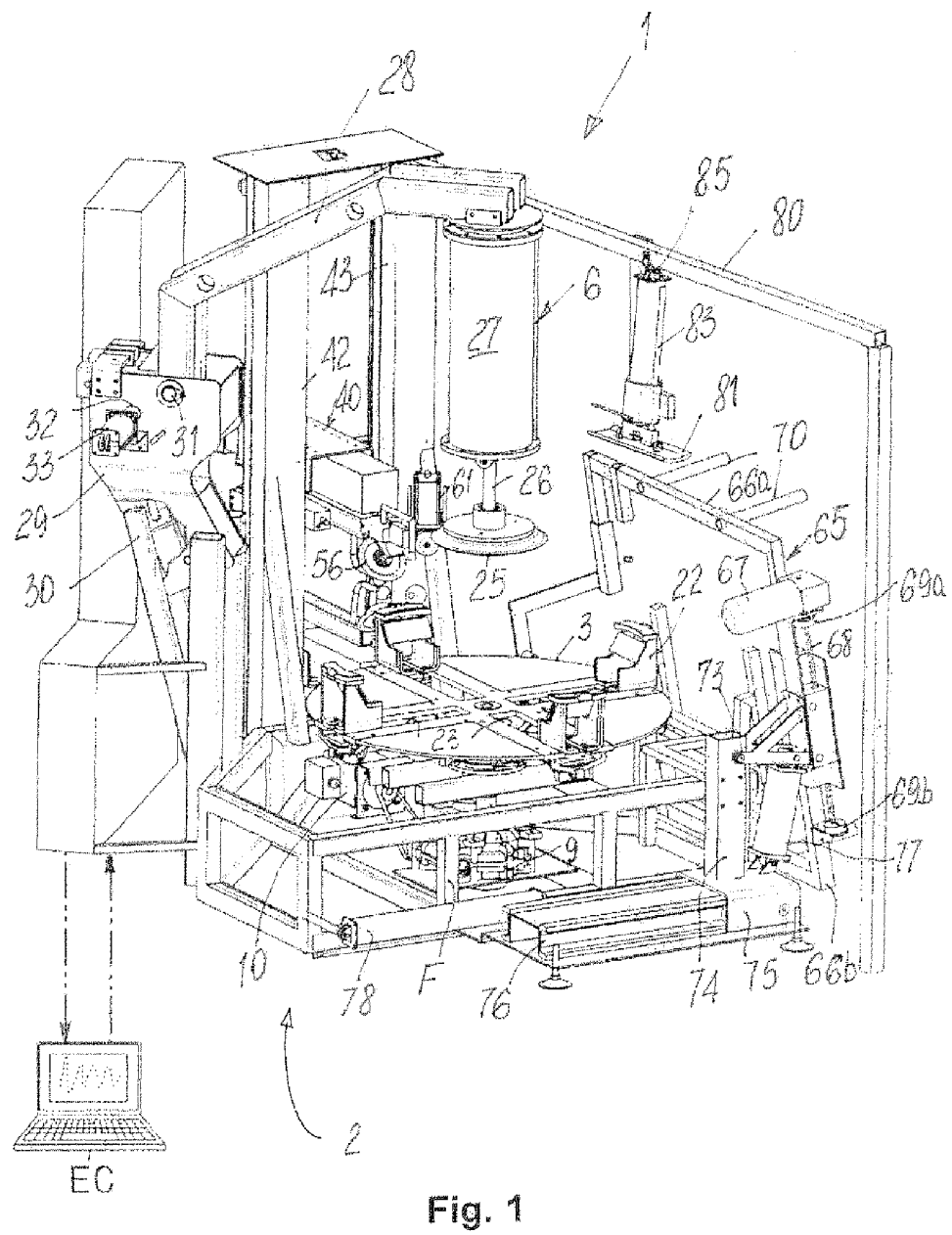
FIG. 1 is a partial diagrammatic elevation front view of a servicing apparatus for servicing a tired wheel.

With reference first to FIGS. 1 and 2, it will be noted that an apparatus 1 for servicing a tired-wheel for motor vehicles comprises a tire assembling-disassembling machine 2 provided with a motor-driven rotatable support table 3 for supporting the wheel to be handled, control or sensor means designed to control both the position of the rotatable table 3, such as an encoder 4, and the load on it, e.g., a clutch 5, a downward urging means 6 acting as a locking means on an intermediate portion of the wheel-rim to make the wheel rigid in rotation with the rotatable support table 3, detecting means 7 designed to measure the size of the wheel-rim of a wheel lying on the support table 3, and preferably also capable of reading a chip, possibly built in the tire or carried by the wheel-rim, as well as an electronic control processing unit EC.

More particularly, the tire assembling-disassembling machine 2 has a support frame F, which supports a support plate 8 (FIG. 2). Underneath the support plate a reduction gear 9 of any suitable type e.g., a worm screw-reduction gear unit is provided, suitable for being driven by a reversible electric motor 10 through a toothed belt transmission 10a. An output shaft 11 of reduction gear 9 extends vertically to engage with a sleeve through an inner pin 13 having a threaded end 14. Sleeve 12 acts as a mandrel with multiple outer diameters which is mounted for rotation on lower bearing 15 and upper bearing 16 and imparts motion to a friction clutch, e.g., electromagnetically coupled friction clutch 5, which transmits the motion to a fifth wheel 18, mounted for rotation about sleeve 12 at bearing 16.

Above the fifth wheel 18, and in meshing engagement with it, four pinion gears 19 equal to each other and substantially horizontal are arranged to be angularly spaced apart through 90° from each other, each of them being designed to engage with one end of a respective threaded shaft 20, and to cause it to rotate therewith. Shafts 20 are also equal to each other and, at the other end of their respective threaded shaft, they engage with a respective worm-screw unit 21 supporting a respective jaw 22 rising upwards from the support table 3 through a respective radial slot formed in the table itself. Each jaw 22 has, in turn, at its top a flat surface 22b coated with a synthetic material 24 of any suitable type with a high friction coefficient, e.g., made of rubber, designed to contact an outer (lower) edge of a wheel-rim. The flat surfaces 22b lie in the same plane normal to the axis of rotation of the output shaft 11, i.e., of rotatable table 3.

With the above described structure, in case a tired-wheel or a wheel-rim of a tired-wheel is placed on jaws 22, once motor 10 is energized, it will cause sleeve 14, and thus fifth wheel 18, to rotate through friction clutch 5. Fifth wheel 18 will actuate threaded shafts 20 causing them to pull jaws 22 towards the axis of sleeve 14 to bring a peripheral, preferably curved, thrust collar 22b, provided at the top of each jaw 22, to abut against the outer (lower) abutment edge of the wheel-rim until this is precisely centered on the rotatable table 3.

After the wheel-rim has been centered, urging device 6 is caused to move downwards, forcedly to lock the wheel-rim to the high friction coefficient material 24. Only after the wheel-rim has been fully locked in position against jaws 22 will the rotary motion of the whole assembly formed by jaws 22 and support table 3 begin. By way of example, platform 3 will rotate, in use, at a variable speed ranging from 8 to 30 revolutions per minute (rpm) with a torque proportional to the load applied to it, e.g., a maximum load of 1000-1100 Nm, required for the specific type of wheel to be serviced.

Encoder 4 makes it possible constantly to control the angular position of table or platform 3 in order to determine the angular position of the inflation valve or that of the hole receiving the inflation valve, and possibly for a wheel pressure sensor, as it will be further explained below.

The urging assembly 6 comprises an urging buffer or plate 25, preferably provided at its lower face with a coating of a high friction coefficient material, such as rubber. The urging buffer or plate is mounted for rotation on a vertical stem 26 and controlled by it. Stem 26 extends from one end of a fluid, preferably air, operated cylinder-piston unit 27, whose other end is hanging from a support arm 28. Support arm 28 is suitable for being displaced between a working position above support table 3 and a rest position so as to keep the space above support table 3 clear, as will be explained below.

From a structural point of view, arm 28 can e.g., overhangingly extend from a fork-like upper-end 29 of a support upright frame 30, rising from support frame F, preferably at the rear side of the tire assembling-disassembling machine 2, so that, at its end proximal to support table 3, it supports fluid operated cylinder 27, whereas at its distal end it is pivoted about a horizontal pin 31. The fluid operated cylinder 27 is safely held in its working position in which it must operate by a second horizontal pin 32, designed to engage with a hole (not shown) formed in a end formation of arm 28 close to pin 31 upon control by an air-operated jack or a pair of juxtaposed air-operated jacks 33 which, upon control, extract it to allow arm 28 to be overturned upwards in order to be moved to its rest position.

Preferably, arm 28 is overturned by a fluid operated jack.

A wheel or wheel-rim lying on the support table 3 is caused to rotate by the friction building up between jaws 22 (material 24) and an edge of the wheel-rim, as well as by the thrust exerted by pressing unit 6 onto the wheel-rim.

FIGS. 3 and 3A diagrammatically show an urging unit 6 that acts on the intermediate portion of the flange of a wheel-rim C provided with a tire T and an inflation valve 34, and lying on a rotatable support table 3 provided with jaws 22, as described above.

FIG. 4 shows a variation in which, instead of the rotatable support table 3, a support plate 35 is provided, which is carried by sleeve 12 at the top thereof, and provided at its head with a centering cone 36 for engaging with the central bore of the flange of wheel-rim C.

In the embodiment shown in FIG. 5, instead of the rotatable support table 3, a frusto-conically shaped support 37 is provided, that is driven by sleeve 12 owing the engagement with the inner side of the lower edge of wheel-rim C in order to center and cause it to rotate.

On support frame F detecting means 7 of any suitable type, e.g., including an infrared sensor or a camera, or a laser sensor, is suitably arranged, which preferably comprises a chip reader of any suitable type, as it is well known to a skilled person in the field of electronics, such a detecting means being designed to measure the diameter and thickness of a wheel-rim loaded on the tire assembling-disassembling machine 2.

As shown in FIG. 3, a laser infrared sensor or a camera 7 is located well above the rotatable support table 3, so as to sight a portion of the outer profile of wheel-rim C located on table 3 to measure the diameter and thickness of the wheel-rim C, and the position of the inflation valve 34, the height of the lying plane of surfaces 22a of jaws 22 acting as a reference zero height mark.

In the embodiments shown in FIGS. 4 and 5, a pair of detectors is provided, i.e., an upper detector 7a, as shown in FIG. 3, and a lower detector 7b acting as a zero reference for any measurements made by the detector.

Any detected measurement data are forwarded to the electronic control processing unit EC to be processed as required, as it will be further explained in below.

Advantageously, in the above described tired-wheel maintenance apparatus the tire assembling-disassembling machine 2 is provided with a pair of extendable and collapsible working arms: an upper arm 40 and a lower arm 41 (FIGS. 6 to 12), known per se in a tire assembling-disassembling machine, but includes control means for controlling the position and the load on the arms that make them suitable for carrying out additional operations besides the typical operations of releasing bead and disassembling tire T from a wheel-rim C.

Figure 6:
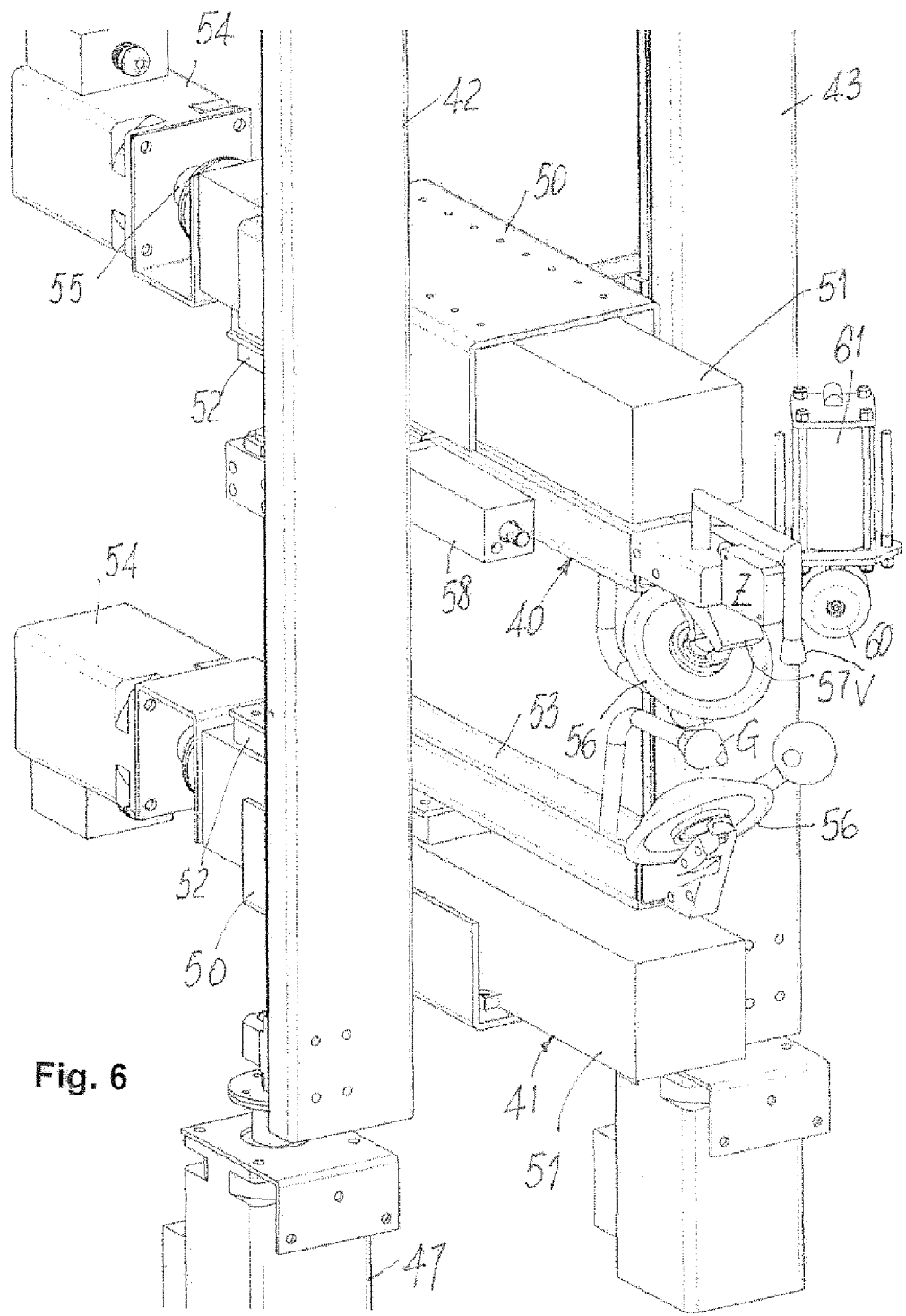
FIG. 6 shows a perspective view on an enlarged scale of a detail of a pair of, namely an upper and a lower, extendable and collapsible working arms, of the apparatus shown in FIG. 1.
Figure 7:
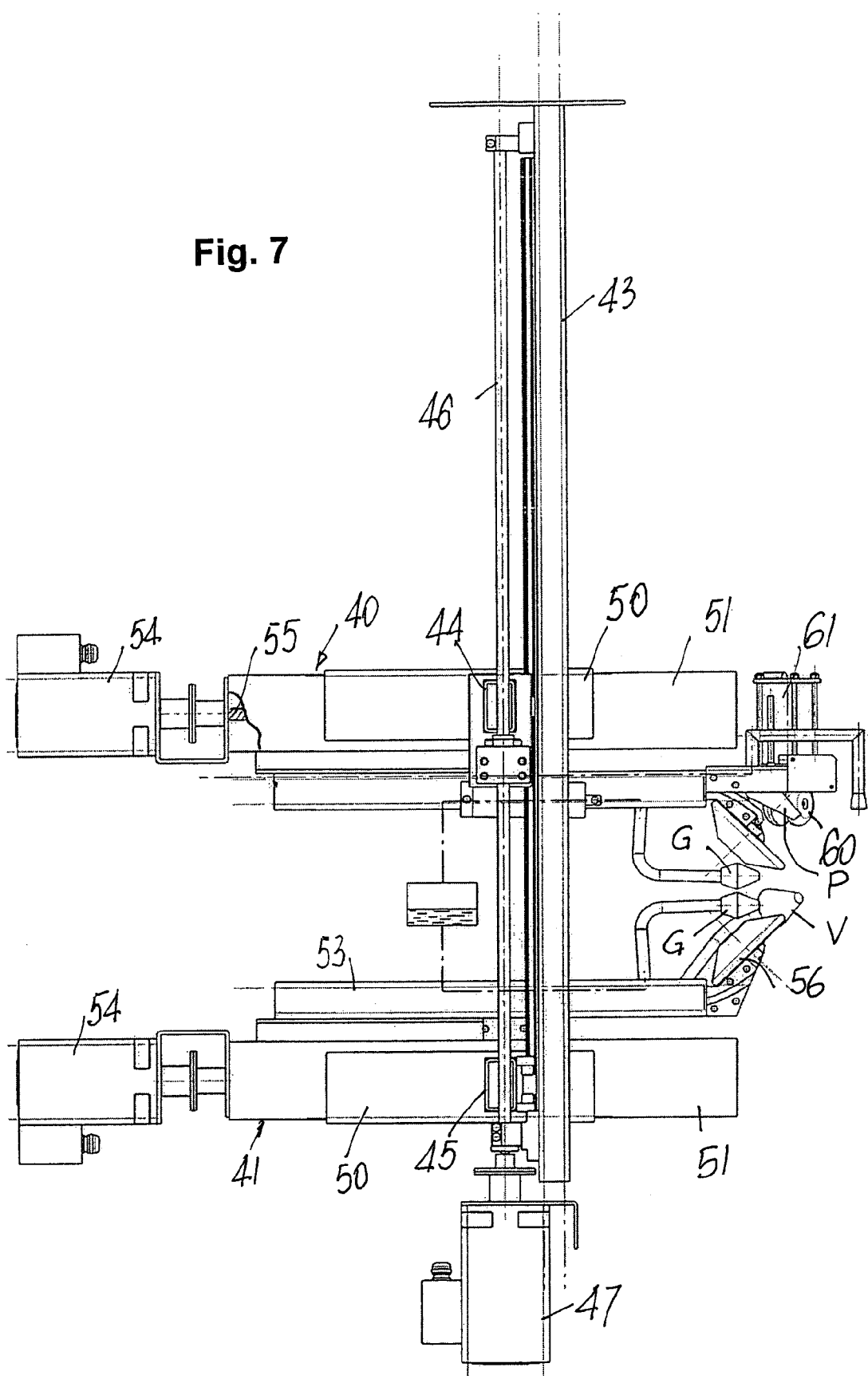
FIG. 7 is a side view of the detail shown in FIG. 6.
Figure 8:
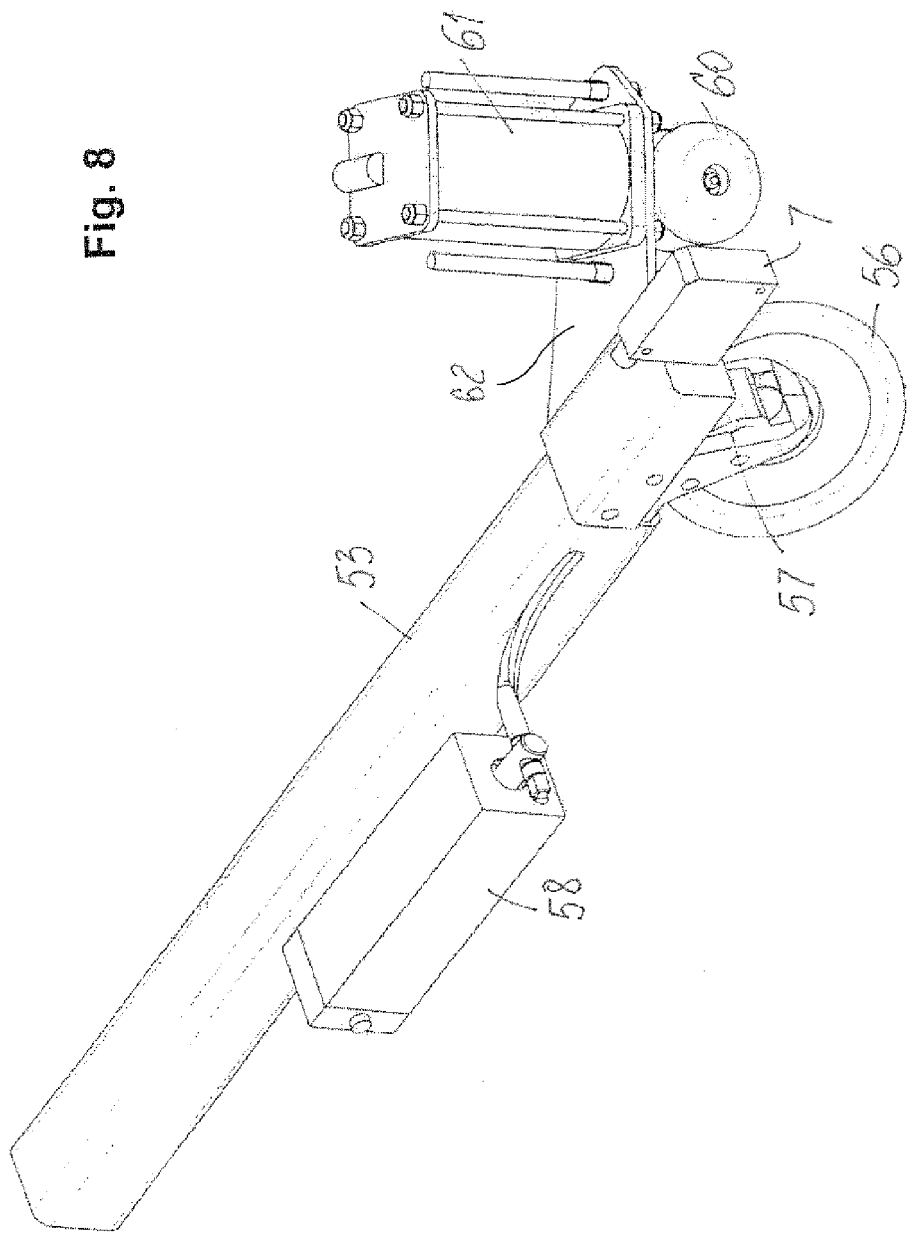
FIG. 8 shows a perspective view of an upper working arm provided with a conical roller at its head, an extendable-collapsible tire-releasing tool, and a positioning sensor.
Figure 9:
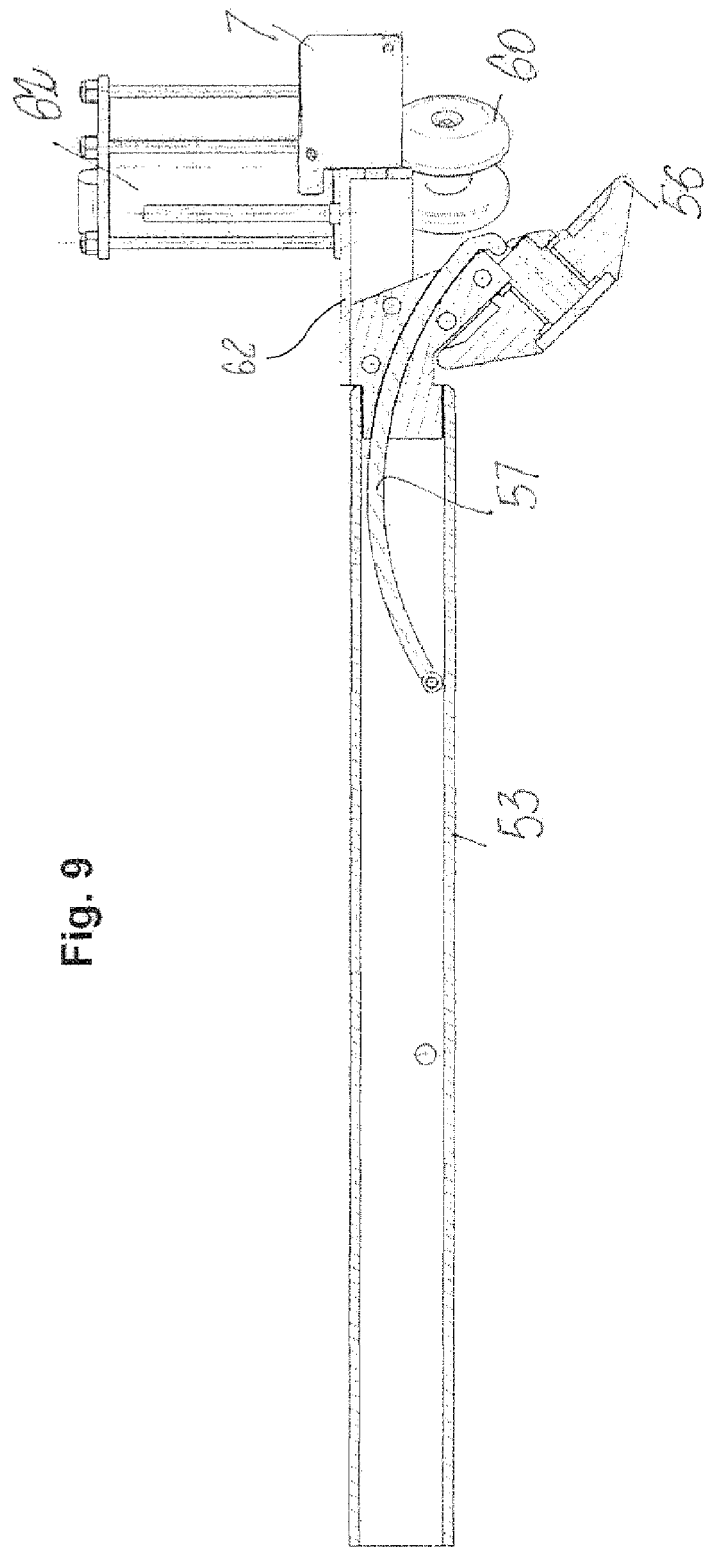
FIG. 9 is a longitudinal section view of the working arm of FIG. 8.

More particularly, working arms 40 and 41 are arranged substantially horizontal and slidably mounted along a pair or parallel guide uprights 42, 43 (FIG. 6), each controlled by a respective screw 44, 45 nut (FIG. 7) in screwing engagement with a threaded shaft 46 extending parallel to the guide uprights 42, 43, and driven in turn by a reversible motor unit 47 preferably of a brushless type normally provided with a gear reduction unit, a load-controlling friction clutch, and an encoder for controlling the angular position thereof (FIG. 7).

Each operating arm 40, 41 comprises a support slide or carriage 50 (FIG. 6) fixed to a respective screw nut 44, 45 and slidably mounted along its respective guide upright 42, 43, a first hollow straight section 51 carried by a respective support slide or carriage 50, a cursor or slider element 52 comprising a slide or carriage, longitudinally slidably mounted with respect to the first hollow section 51 and protruding therefrom, a second straight section 53 supported by respective slide or carriage 52 and a control reversible motor 54 for slide or carriage 52, so that the second straight section 53 is extendable and retractable with respect to the first section 51. As an example, motor 54 can drive a threaded shaft 55 that through a screw nut controls the slide or carriage 52 in a manner very similar to that illustrated with reference to threaded shaft 46 shown in FIG. 7.

Straight section 53 is provided at the head thereof with an idle frusto-conical roller 56 as well as with a retractable bead removing tool 57 driven by a respective air operated jack 58 (FIG. 8), e.g., as disclosed by Italian patent IT-1 328 351 published on May 21, 2003.

A positioning sensor 17 is provided, e.g., overhangingly supported close to the frusto-conical roller 56 (FIGS. 8 and 9), which preferably comprises a chip reader as well as a mounting pushing element 60 suitable for being driven by a fluid-operated cylinder 61 overhangingly supported by a jaw 62 carried by section 53. Moreover, an inflation cap C is also preferably acting as a greasing nozzle G, a gripping element P arranged to tear off and remove an inflation valve made of rubber already fitted into the wheel-rim, and an arm V for automatically fitting or mounting an inflation valve into its respective seat formed in the wheel-rim (FIGS. 6 and 7).

Figure 10:
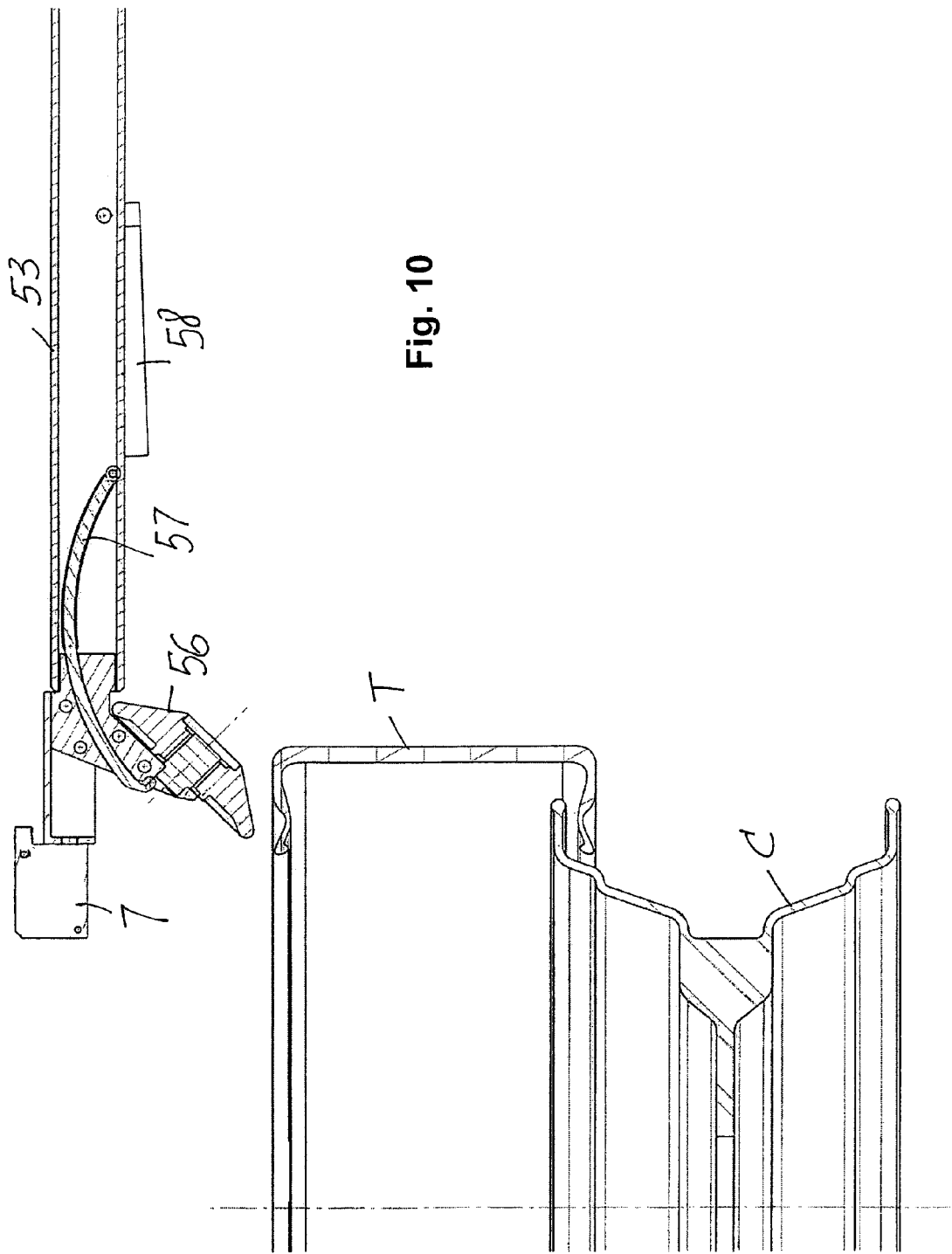
FIG. 10 is the working arm of FIG. 8 provided with a conical roller in abutment against a tire bead.
Figure 11:
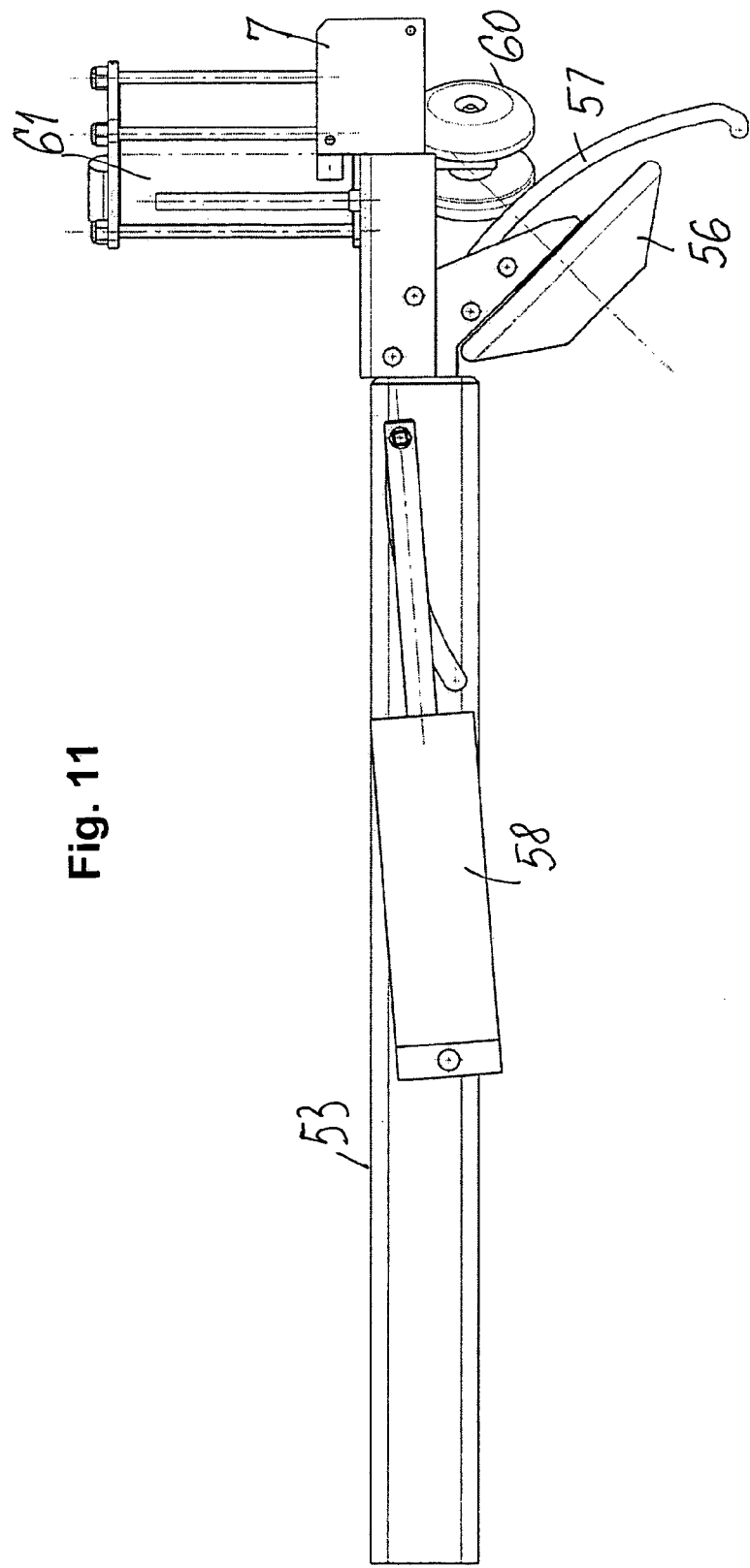
FIG. 11 illustrates the arm shown in FIG. 8 with its bead-releasing tool in its extended position.
Figure 12:
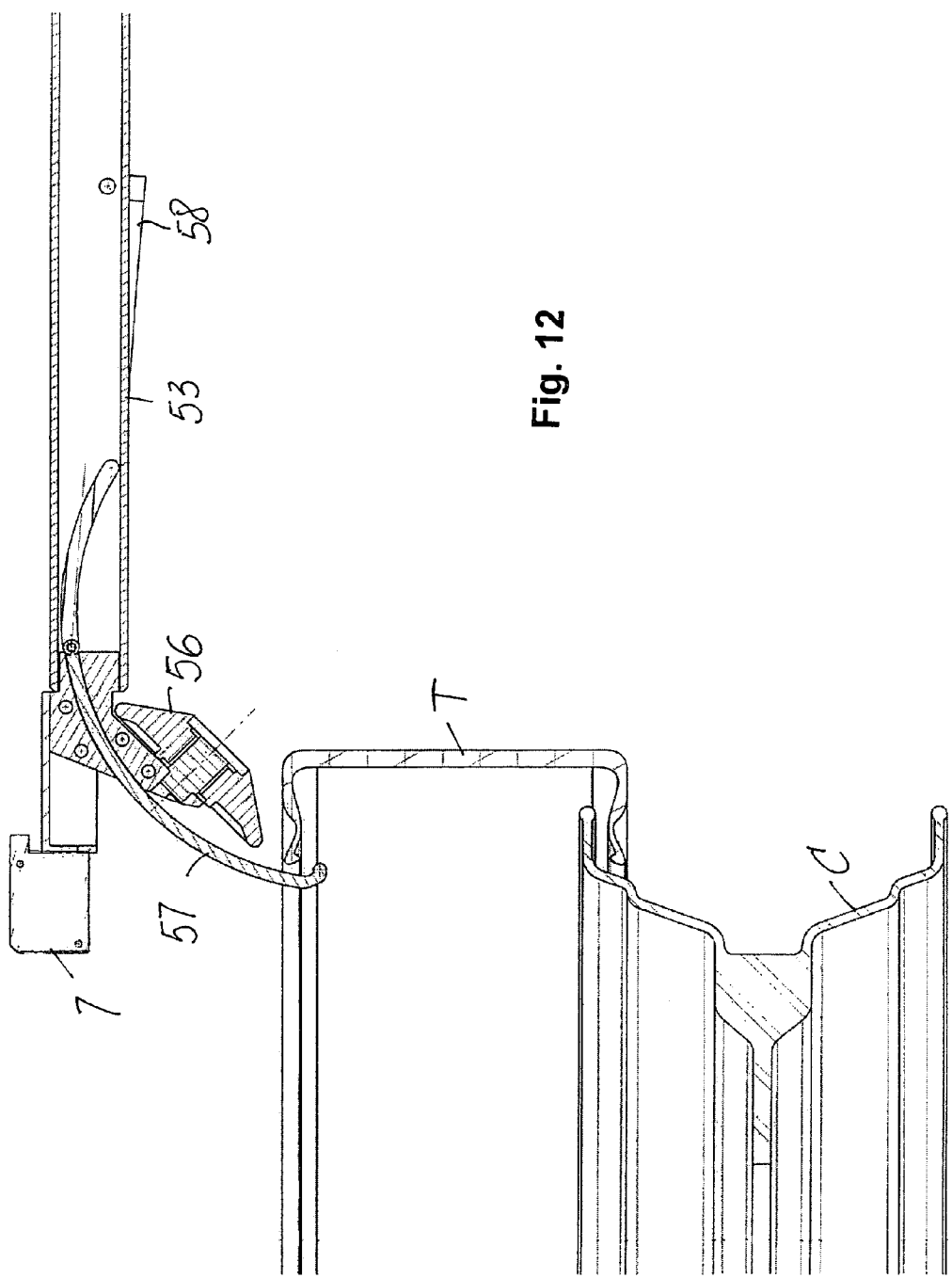
FIG. 12 shows a longitudinal section view of the arm shown in FIG. 11, having its bead releasing tool in engagement with the inner edge of a tire disassembled from an underlying wheel-rim.

FIG. 10 shows a frusto-conical roller 56 with a tire T in its bead releasing position, whereas FIGS. 11 and 12 show the bead-releasing tool 57 in its fully extended position and in engagement with the inner edge of a tire T disassembled from a wheel-rim C by means of bead removing tool.

As shown in FIG. 1, the servicing apparatus 1 is preferably provided with an automatic loading-unloading device 65, which includes a substantially flat support frame, e.g., made of tubular members, consisting of two juxtaposed halves 66a and 66b, e.g., telescopically connected to each other, so that the support frame is extendible and retractable. At one or more sides of the support frame one or more respective linear actuators, e.g., reversible motor-reduction assemblies 67 are provided designed to drive a double start screw threaded shaft 68, onto which two screw nuts 69a and 69b connected to a respective half 66a, 66b of the frame are screwable. Thus, when threaded shaft 68 is set in rotation in one direction, the two halves 66a and 66b of the support frame are moved apart from each other, and are brought together when the shaft 68 is caused to rotate in the opposite direction.

Preferably, the two halves 66a and 66b of the frame are provided with rubberized pins or rollers 70 to restrain and clamp a tire or a tired-wheel loaded on the support frame, so that the tire or wheel can then be forced and centered within the perimeter of the support frame.

Figure 1A:
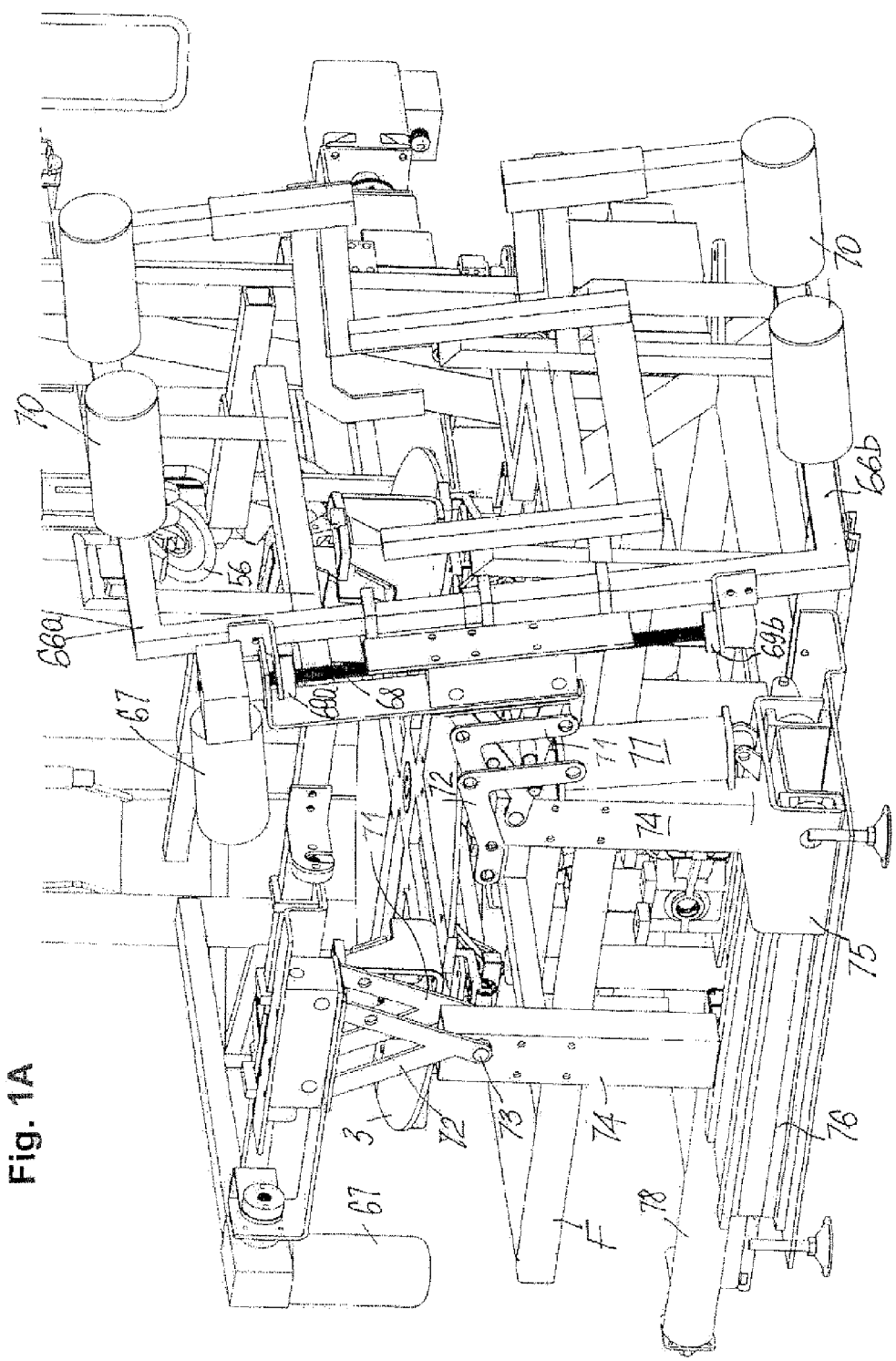
FIG. 1A shows a side view of a loading frame of the apparatus of FIG. 1.
Figure 1B:
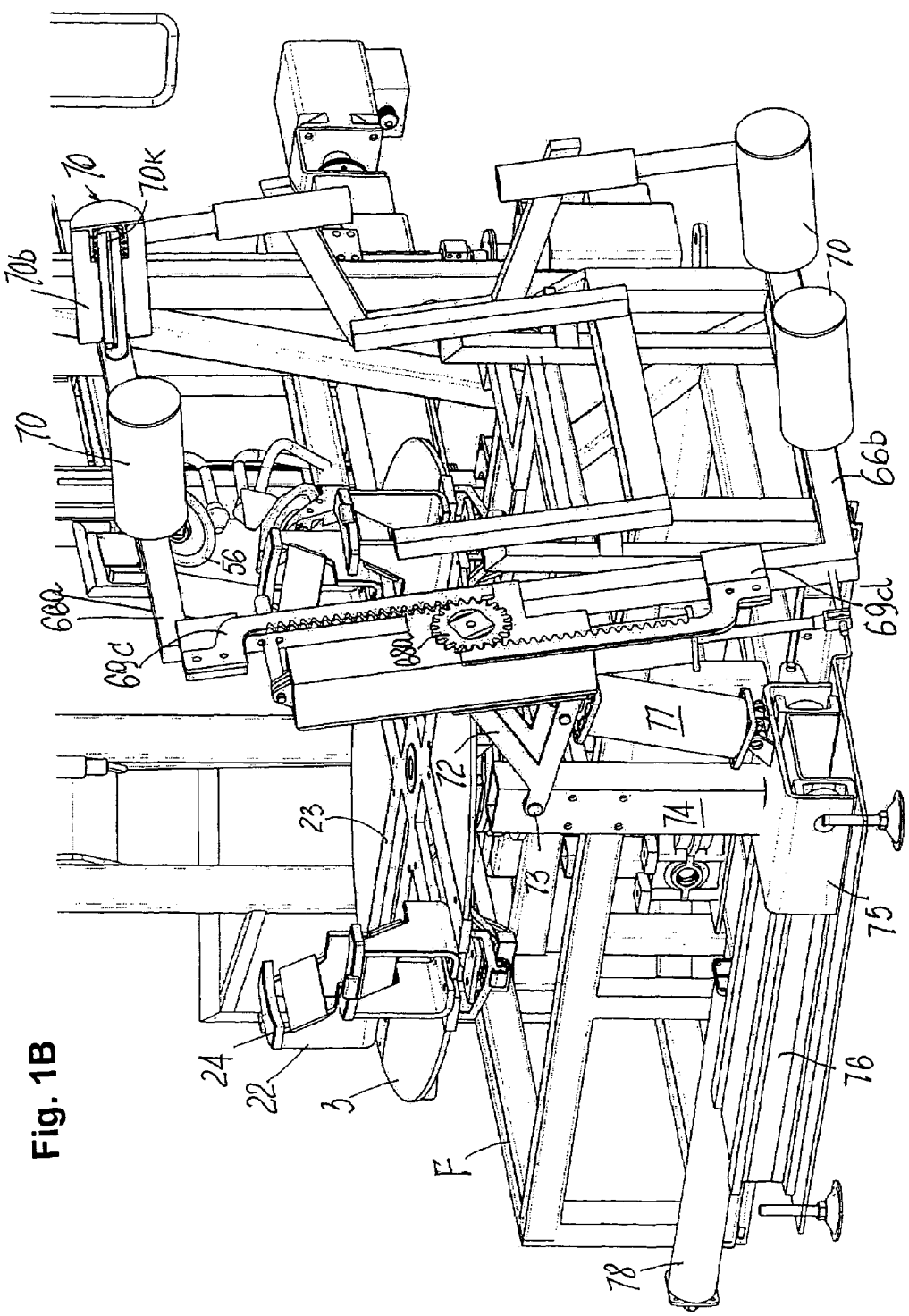
FIG. 1B illustrates a view similar to that of FIG. 1A according to a variation.
Figure 1C:
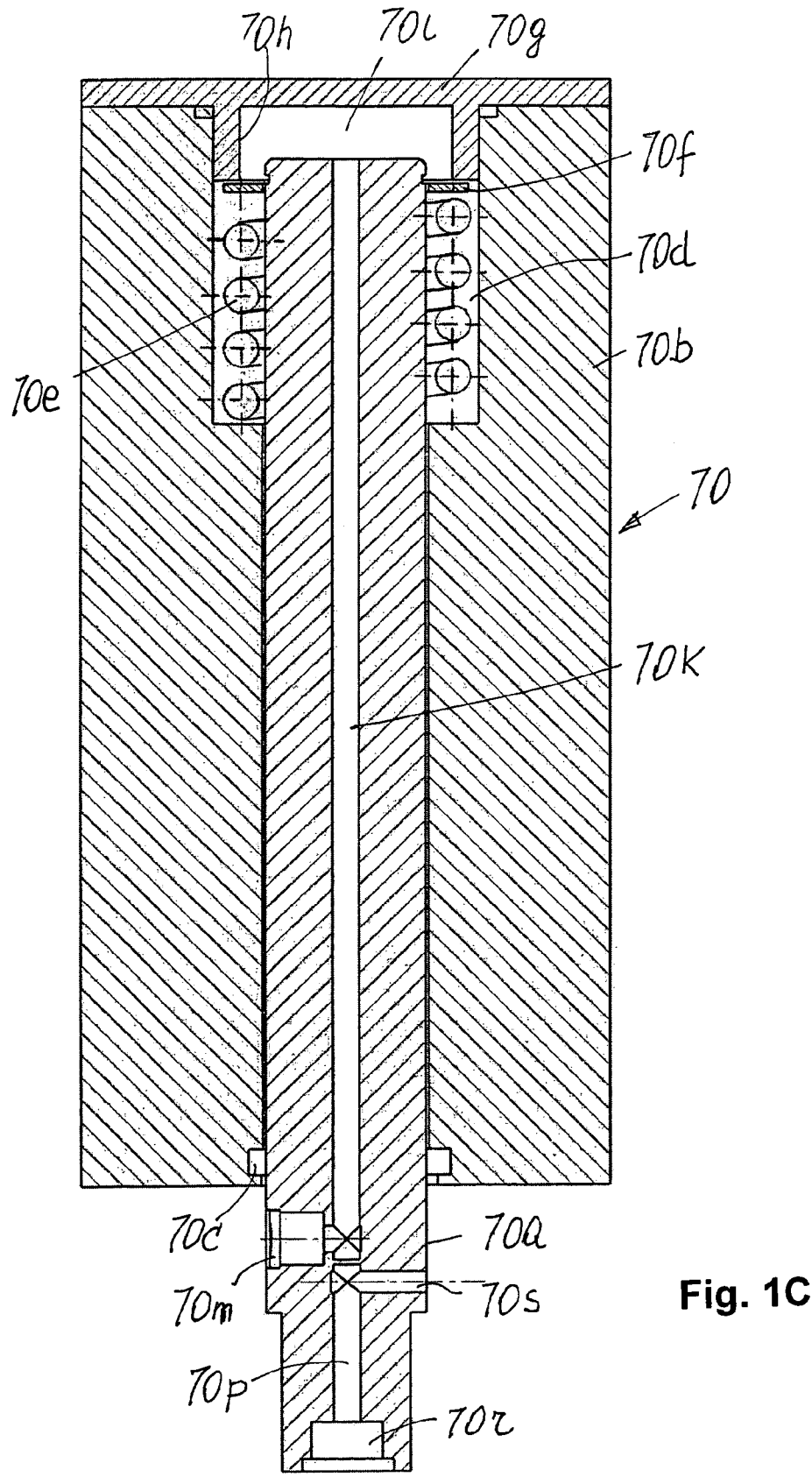
FIG. 1C shows a detail of FIGS. 1A and 1B.

FIG. 1C shows a rubberized roller having support pin 70a on an end section of which a jacket 70b made of rubber or another material with a high friction coefficient is slidably mounted. More particularly, jacket 70b has two inner diameters: a smaller diameter substantially the same as that of pin 70a at which an annular slot 70c is formed for receiving a sealing gasket, and a larger diameter at the top of pin 70a which delimits a receiving gap 70d for a return spring 70e held in position by a seger ring 70f.

Jacket 70b is closed at its head by a lid element 70g having an inner relief ring 70h suitable for abutting against the seger ring 70f and delimiting a chamber 70i that is in fluid communication with a compressed air source through an axial duct 70k within pin 70a and a side outlet 70m provided in a section of pin 70a not covered by the jacket. Thus, when compressed air is fed to duct 70k, pressure builds up within chamber 70*i* and causes jacket 70*b* to be axially displaced so that it extends out of pin 70*a*, whereas when the same duct is placed in fluid communication with the environmental air, the return spring 70*e* will cause jacket 70*b* to return to its retreated position shown in FIG. 1C.

Preferably, each pin 70*a* also has a second axial hole 70*p* with an axial inlet mouth 70*r* for connection to a compressed air source, and a radial outlet mouth 70*s* for feeding compressed air to the gap between the lower edge of a wheel-rim and the bead of its respective tire located on the loading frame 66, in order to effect a quick inflation after the tire has been fitted onto the wheel-rim.

The support frame is fixed at the middle line thereof to one end of two support brackets or levers 71 and 72, whose other end is pivoted to a pair of pins 73 aligned along the same horizontal axis and carried by a respective upright 74 rising from a respective slide or carriage 75 slidably mounted onto a horizontal section bar 76, extending normal to the axis of pins 73 and preferably made rigid with frame F of the tire assembling-disassembling machine 2.

At least one support brackets or levers 71, 72 is articulated to one end of a fluid, e.g., air, operated jack 77, whose other end is articulated to a slide or carriage 75 so that support frame 66*a*, 66*b* can be angularly displaced by jack 77 between a lowered idle position with a slightly tilted attitude with respect to a vertical line, as shown in FIG. 1, and a working position lifted above the height of the rotatable support table 3 by the action exerted by the jack. Moreover, slide or carriage 75 is controlled by a fluid operated jack 78 designed to cause it to move together with the support frame 66*a*, 66*b* along guide section bar 76, so as to move the frame from a side position with respect to the tire assembling-disassembling machine 2 to a centered position above the rotatable support plate 3.

FIG. 1B shows a variation of FIG. 1A in which a pair of racks 69*c* and 69*d* driven by a motor reduction unit 67 and in meshing engagement with a toothed wheel 68*a* is provided.

With the above described structure, once laid against the support frame 66*a*, 66*b* in its idle or waiting position (FIG. 1*a*), a wheel-rim or a tired-wheel to be serviced is first clamped between pins 70 of the frame by means of motor reduction unit 67. Pins 70 are fed with compressed air to remove or slightly lift the wheel from its support plane formed by the frame, and subsequently, or synchronously, the wheel is lifted and centered above the rotatable support plate 3. At this stage, compressed air feed to pins 70 is discontinued, and thus the wheel is slightly lowered, centered and laid on jaws 22 within ridges 22*b* (FIG. 2). Jaws 22 are then caused to move towards the centre of the rotatable plate 3 and then to clamp the wheel-rim therebetween at the ridges 22*b*.

Once the servicing has been completed, support frame 66*a*, 66*b* proceeds with automatically unloading the wheel and lying it onto the ground. To this end, compressed air is fed to pins 70, whereby lifting the wheel to a height greater than that of the ridges 22*b*, and then jacks 77 and 78 are energized to allow the frame to be returned to its starting position.

Figure 13:
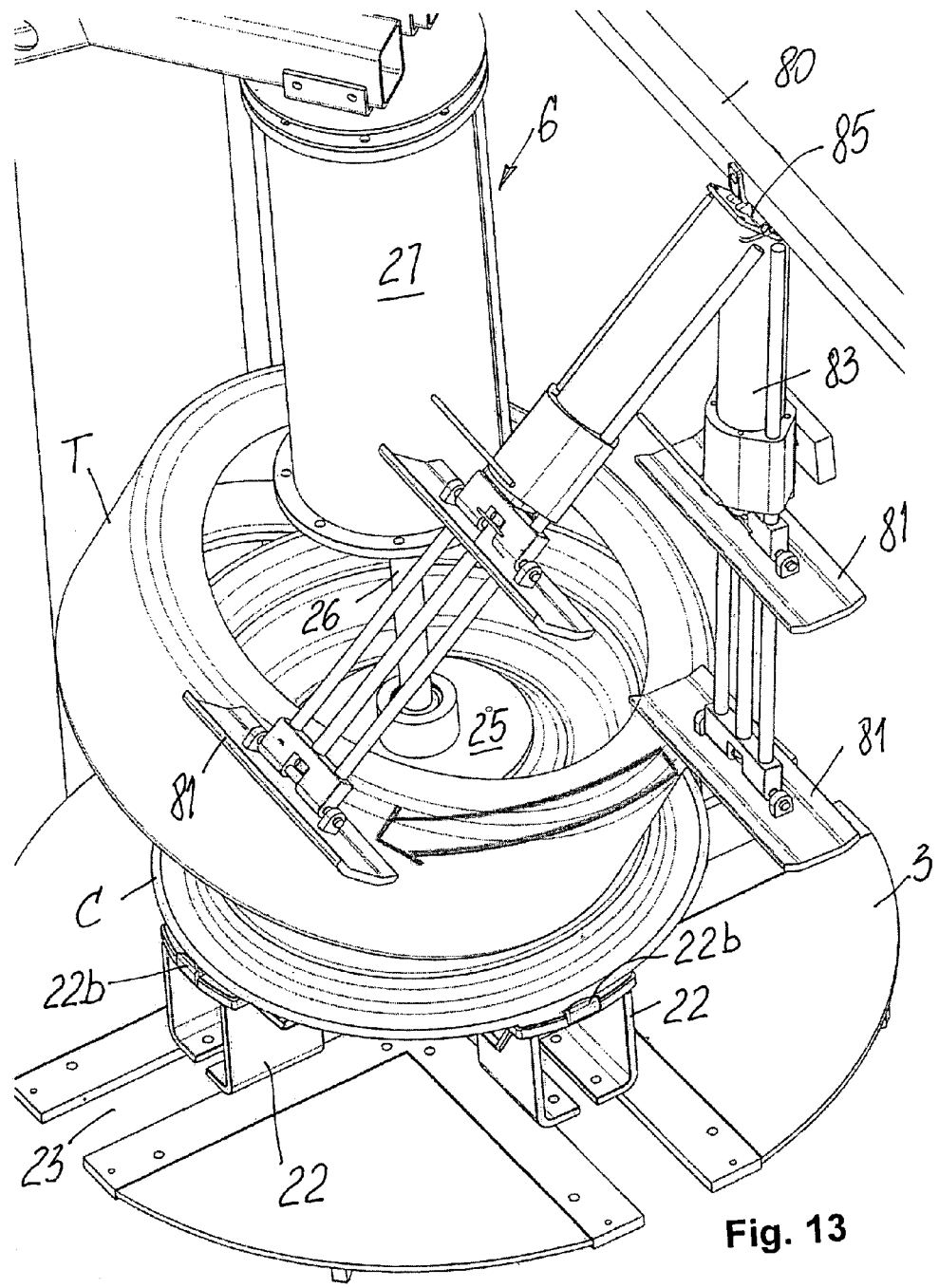
FIG. 13 shows a perspective view, slightly from above, of a tool for fitting a bead into a wheel-rim in a working stage thereof.

FIG. 13 shows on an enlarged scale a fitting belonging to the servicing apparatus shown in FIG. 1 while carrying out an operation of fitting a tire T onto a wheel-rim C located on rotatable support plate 3. The fitting tool is hanging from an overhanging support, such as an arm 80, e.g., overhangingly extending from the top of guide uprights 42 and 43, or supported in any other suitable way, and formed with an urging sliding block 81, articulated to the lower end of a fluid operated jack 83, whose upper end is articulated about a pin 85, carried by arm 80 in any suitable way, so that, in use, jack 83 can bring sliding block 81 to lie onto a tire to be fitted and press the tire through a given angular displacement thereof when the tire is caused to rotate to force it to be fitted into wheel-rim C (FIG. 13).

Figure 14:
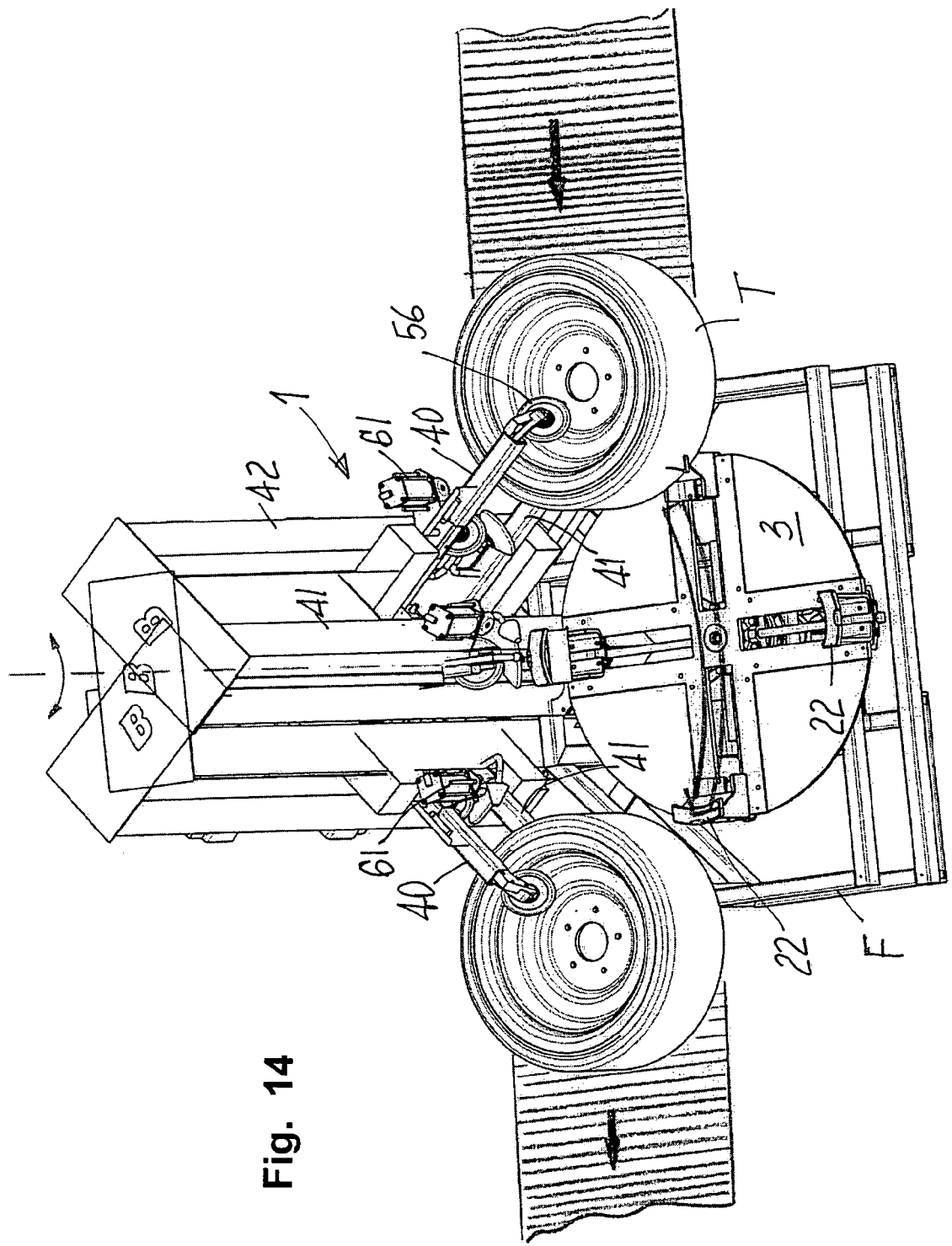
FIG. 14 is a perspective view, slightly from above, of a variation of the servicing apparatus shown in FIG. 1.

In the embodiment shown in FIG. 14, the pair of uprights 42 and 43 is mounted for rotation about a common vertical axis, so that they are controlled to be angularly displaced about it, e.g., by being controlled by a reversible motor of any suitable type. Working arms 40 and 41 act as gripping elements for a tire T or a tired wheel to be serviced and, once centered, are arranged to load the wheel onto the rotatable support plate 3 and unload it from plate 3 when the maintenance is completed.

Figure 15:
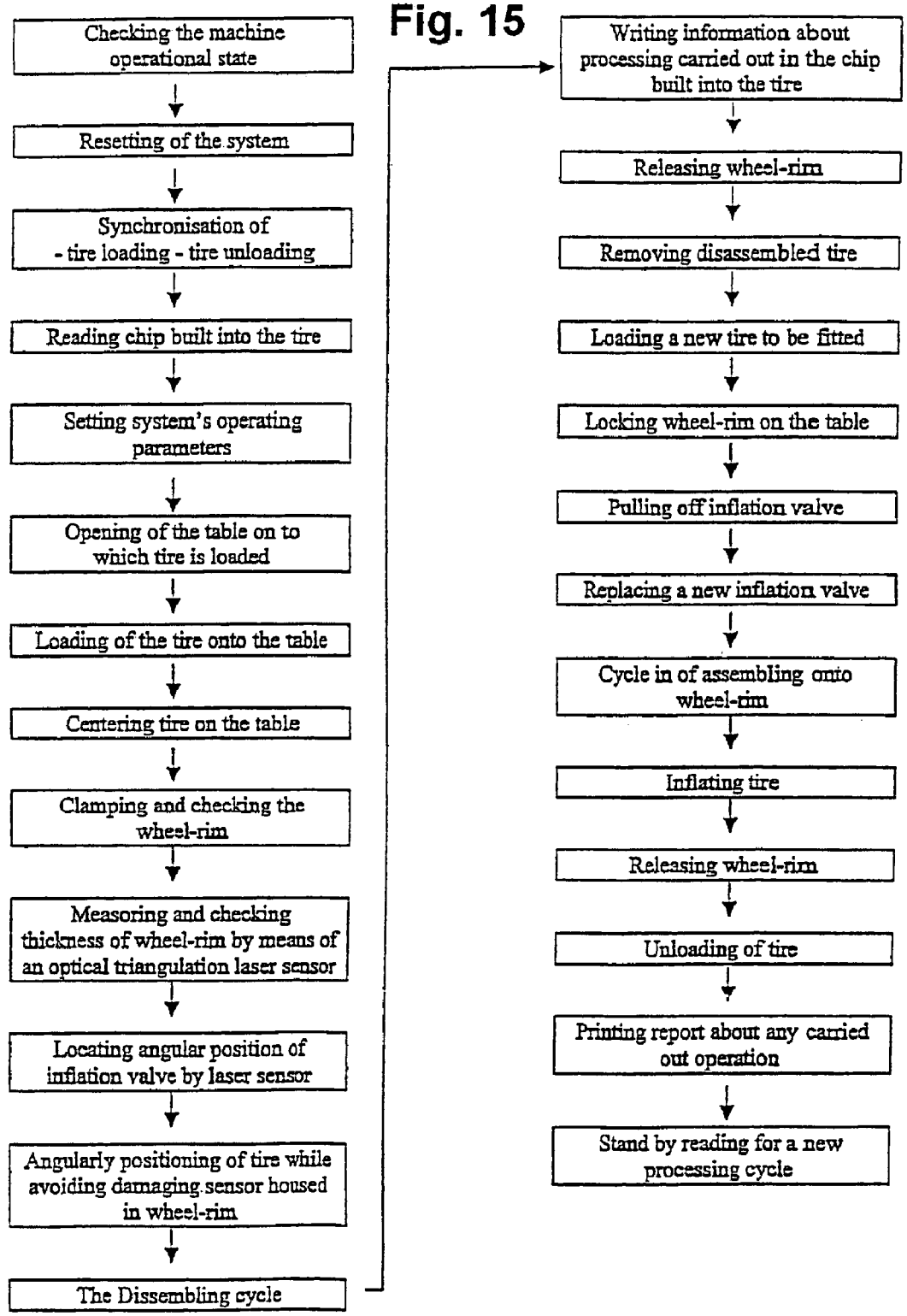
FIG. 15 is a flow chart, or flow diagram, illustrating the operating sequence that the servicing apparatus has to carry out in order to effect a full tire assembling-disassembling operation onto or from a wheel-rim.
Figure 16:
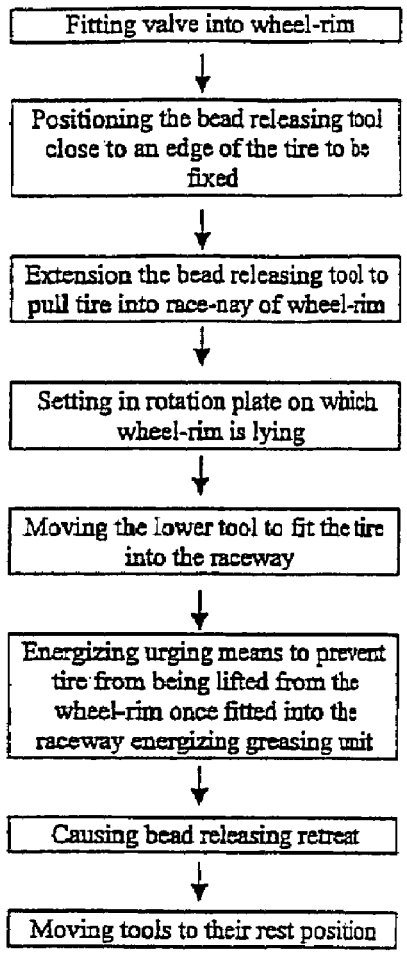
FIG. 16 shows a block-diagram, or flow-chart, showing a disassembling cycle of a tire from a wheel-rim.
Figure 17:
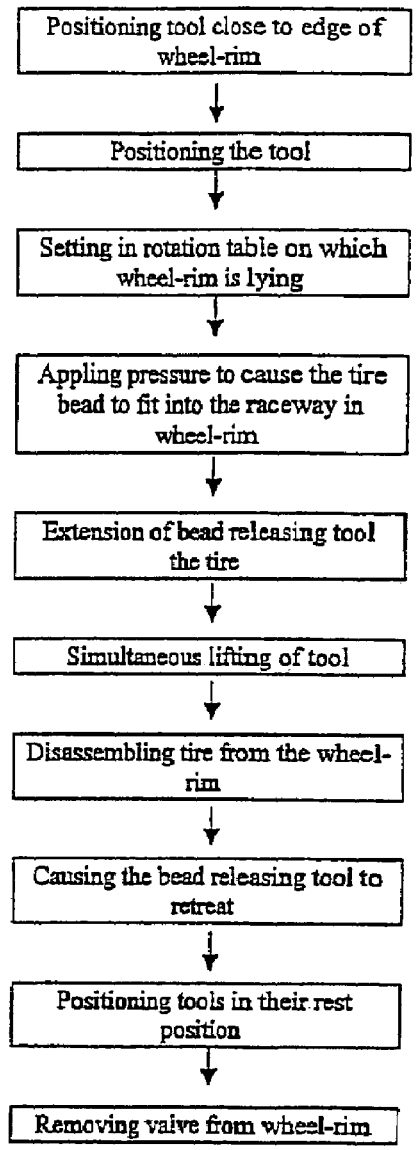
FIG. 17 shows a block-diagram, or flow-chart, of an assembling cycle of a tire with a wheel-rim.

FIGS. 15 to 17 show the operating sequence of the several working steps provided by the control software stored in the electronic processing unit EC.

First of all, maintenance apparatus 1 is checked for proper operation, then the system is reset, and synchronization with the tire loading-unloading means (loading frame 66*a*, 66*b*—FIG. 1, or else working arms 40 and 41 in FIG. 14) is effected. By means of a suitable chip reader located close to the sensing means 7, or arranged elsewhere, the chip possibly fitted into tire T and storing the system's working parameters is read.

At this stage, jaws 22, provided in rotatable support table 3, are opened or spread apart from each other and the tired-wheel or wheel-rim is loaded onto jaws 22. The wheel or the wheel-rim is centered onto jaws 22, and locked in position thereon by means of ridges 22*b*, as explained with reference to FIG. 2.

Laser sensors 7 or 7*a* then measure the thickness and diameter of wheel-rim C by optical triangulation, and locate the position of the inflation valve or the hole or seat provided for receiving an inflation valve. Possibly, the wheel is angularly displaced to avoid to damage a sensor fitted close to the inflation valve in the wheel-rim.

At this stage, a tire disassembling cycle can be started, as shown in FIG. 16.

The upper working arm 40 is first positioned so that its roller 56 is brought close to the outer edge of the wheel-rim. Likewise, lower working arm 41 is positioned so that its roller 56 is brought close to the lower edge of the wheel-rim.

Urging or pressure plate 25 is lowered against the flange of wheel-rim C, then air is cut off from pins 70, so as to urge the wheel onto jaws 22 that clamp the wheel-rim after the rotatable plate 3, and thus the wheel arranged thereon, has been set in rotation. Working arms 40, 41 exert a pressure against the beads of the tire close to the edges of the wheel-rim in order to release the tire-bead.

Bead-removing tools 57 then extend from both arms 40, 41 to disassemble tire T from wheel-rim C. Tools 56 are then controlled synchronously to rise, after having previously moved slightly backwards beyond the wheel-rim diameter to cause tire T to be disassembled from the wheel-rim. Bead-removing tool 57 is retreated and one possibly proceeds with the extraction of the inflation valve by means of extraction element P.

Information relating to detection and disassembling steps which have already been carried out is possibly entered into the chip fitted in the tire, and the tire is removed. Should the wheel rim be found to be damaged, it is released and replaced with a new one. Moreover, a report about the carried out operations is printed and apparatus 1 is set in a standby or idle mode ready to start a new maintenance cycle.

On the other hand, if only the tire is to be replaced, urging device 6 is lifted or, in any case, moved away, the worn-out tire is removed, and a new tire is loaded on the wheel-rim located on support table 3. In the embodiment shown in FIG. 14, the old tire can be removed and a new tire loaded by means of working arms 40 and 41.

Urging or pressure device 6 is once again caused to act upon the wheel-rim to hold it abutting against jaws 22, a new inflation valve is then fitted by means of arm V, and an air operated mounting cycle initiated, as shown in FIG. 17.

At the beginning, lower working arm 41 is positioned so that its roller 56 is arranged close to the lower edge of the wheel-rim, and bead-removing tool 57 is caused to extend out of arm 41. Then, when provided, the fitting tool shown in FIG. 13 is positioned in its open configuration on tire T lying on the wheel-rim. The mounting urging or pressure device 60 is preferably caused to be lowered onto the tire, and energized, while rotatable table 3 is set in rotation, and thus owing to the action exerted by the mounting urging device the wheel-rim and the tire are also caused to rotate, the tire being urged against the wheel-rim by sliding-block 81.

Finally, once the mounting has been accomplished, inflation cap V, and thus greasing device G, are actuated, the bead releasing tool 57 is caused to be collapsed, and tool 56 (arm 41) is positioned in its resting position.

Then, one proceeds with moving away urging device 6, and causing the tired-wheel to be removed either by means of frame 66a, 66b, which have previously lifted rollers 70 (FIG. 1), or by means of working arms 42 and 43 (FIG. 14).

A report listing the operations carried out is printed in the end, and the maintenance apparatus is set in an idle mode.

Figure 18:
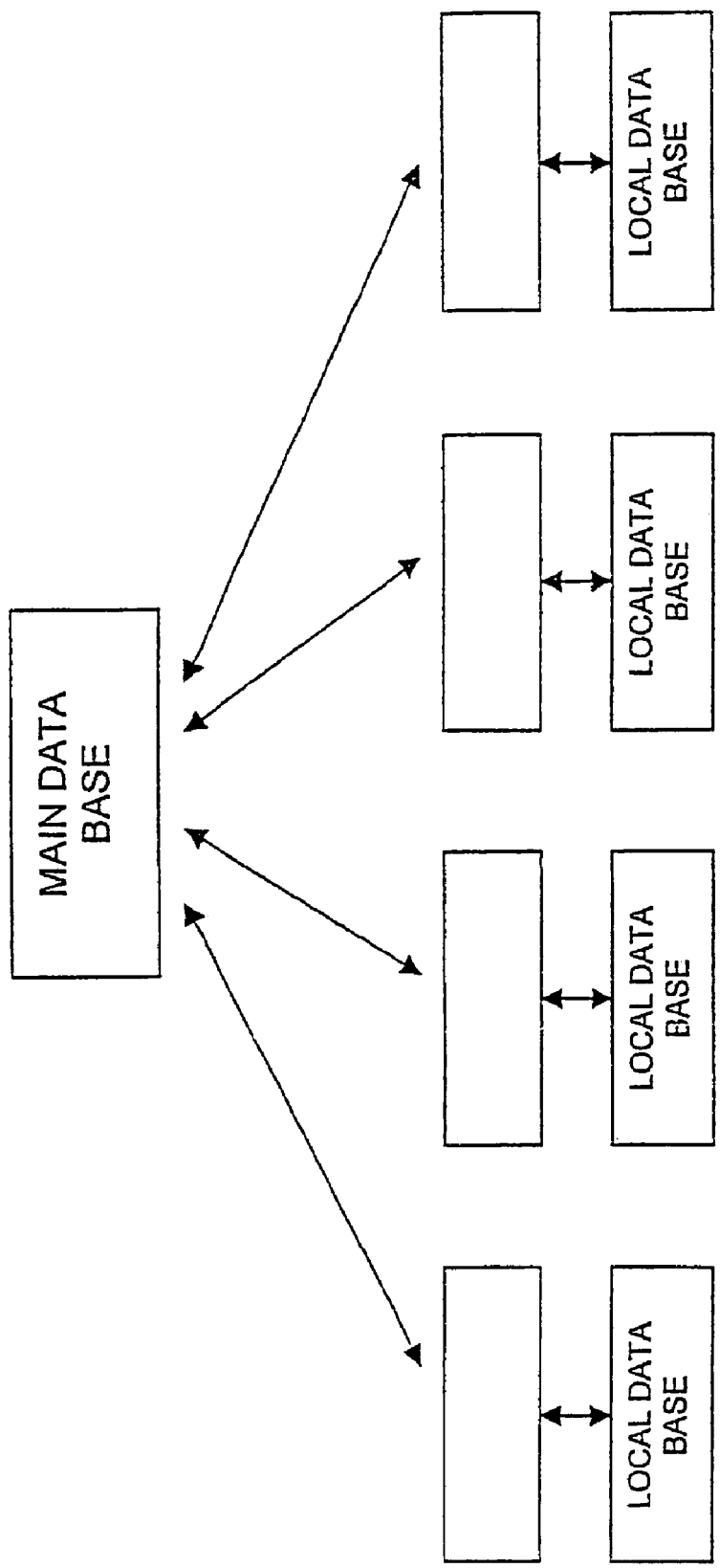
FIG. 18 illustrates a block-diagram showing a plurality of servicing apparatuses that can be connected to, and dialog with, one data base.

FIG. 18 diagrammatically shows a self-learning system for the maintenance apparatus, while keeping up-dated a suitable data-base containing directions required to carry out a correct sequence of disassembling or assembling operations for a specific tire provided with a chip.

A plurality of maintenance apparatuses are connected in a network both to a, preferably world-wide, central data-base, or server, and to a local data-base. The information stored in data-bases can be downloaded by any enabled maintenance apparatus 1, e.g., subject to authorization. At the same time, each maintenance apparatus 1 assists in updating its local data-base.

It is also contemplated that each maintenance apparatus 1 is suitable for carrying out an uploading step of the central data-base or the server. In particular, it is possible to store the assembling and/or disassembling sequence of a tire onto and from its respective wheel-rim that is not contained in the latest release available at the central data-base.

The stored sequence of operations is then sent to the central data base and, possibly, once it has been assessed and checked by an appointed entity, entered into the central data-base, thereby generating a new release of the data-base.

In order to carry out the data-base downloading and uploading steps, any available communication network can be used, such as internet, telephone network, or a satellite-based network.

The above network can also be applied at the level of one tire-maintenance centre, where a plurality of maintenance apparatuses 1 can be interconnected or connected to a preexisting network. In such a case an Ethernet-type network or a wireless network can be used as a communication network, through which each maintenance apparatus 1 gains access to a local central server in charge of keeping its data-base up-dated with the latest available release thereof.

The above described invention is susceptible to numerous modifications and variations without departing the scope thereof as defined by the claims.

The invention claimed is:

1. A method for automatically servicing a tired-wheel having a wheel-rim and a tire thereon, comprising:
    loading said tired-wheel onto a motor-driven support mounted for rotation about an axis of rotation,
    centering said tired-wheel with respect to said axis of rotation, and holding said tired-wheel by said motor-driven rotatable support,
    urging the wheel-rim against said rotatable support by an urging device so that said tired-wheel rotates with said rotatable support,
    disassembling said tire from said wheel-rim by a pair of working arms,
    moving away said urging device and removing said disassembled tire,
    loading a new tire onto the wheel-rim,
    repositioning said urging device and urging said wheel-rim against said rotatable support, and
    mounting said new tire onto said wheel-rim by said pair of working arms.

2. A method according to claim 1, comprising reading information data identifying said tired-wheel.

3. A method according to claim 2, wherein said reading comprises reading the diameter and the thickness of said tire.

4. A method according to claim 3, wherein said reading comprises reading a chip built into said tired-wheel.

5. A method according to claim 2, wherein after said tire has been disassembled from said wheel-rim, information is entered into a chip built into said tire.

6. A method according to claim 5, wherein after said tire has been disassembled, the method comprising printing a list of any service operations carried out.

7. A method according to claim 1, wherein said reading comprises locating the position of an inflation valve in the wheel-rim of said tired wheel.

8. A method according to claim 1, wherein the step of loading said tired-wheel comprises
    lying said wheel on a support structure designed to be moved from a rest or wheel-receiving position to a working position above said rotatable support by loading and unloading structure,
    clamping said wheel on said support structure by a plurality of clamping elements,
    moving said loading-unloading structure away from said support structure,
    moving said support structure to a working position, thereby bringing the loaded wheel above said rotatable support, and
    causing said wheel controllably to return closer towards said support structure, thereby bringing said wheel onto said rotatable support.

9. A method according to claim 8, wherein said wheel is moved away from, and towards to, said support structure by said clamping elements.

10. A method according to claim 1, wherein said disassembling step comprises removing an inflation valve built-into said tired-wheel by pulling said inflation valve off.

11. A method according to claim 10, comprising fitting a new inflation valve.

12. A method according to claim 1, comprising the step of automatically inflating said tire after the same has been fitted onto said wheel rim.

\* \* \* \* \*